United States Patent
Jintaseranee et al.

(10) Patent No.: US 8,571,022 B1
(45) Date of Patent: Oct. 29, 2013

(54) PACKET FILTERING BY SESSION SETUP ASSOCIATION IN A WIRELESS COMMUNICATION SYSTEM

(75) Inventors: Kosol Jintaseranee, San Jose, CA (US); Travis Edward Dawson, San Francisco, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 247 days.

(21) Appl. No.: 12/762,575

(22) Filed: Apr. 19, 2010

(51) Int. Cl.
 *H04L 12/28* (2006.01)
 *H04L 12/56* (2011.01)

(52) U.S. Cl.
 USPC .......................................................... 370/389

(58) Field of Classification Search
 USPC .......................................................... 370/389
 See application file for complete search history.

(56) References Cited

U.S. PATENT DOCUMENTS

| | | | |
|---|---|---|---|
| 7,218,630 B1 | 5/2007 | Rahman | |
| 7,453,894 B1 * | 11/2008 | Qin et al. | 370/401 |
| 7,853,680 B2 * | 12/2010 | Phatak | 709/223 |
| 7,924,789 B1 * | 4/2011 | Breau et al. | 370/331 |
| 2005/0193391 A1 * | 9/2005 | Demsey et al. | 719/313 |
| 2008/0139166 A1 | 6/2008 | Agarwal et al. | |

* cited by examiner

*Primary Examiner* — Ayaz Sheikh
*Assistant Examiner* — Blanche Wong

(57) ABSTRACT

Embodiments disclosed herein provide systems and methods for packet filtering in a wireless communication network. In a particular embodiment, a wireless network receives from a requesting device a request for a plurality of data packets to be transferred by a source for delivery to the requesting device. The network then generates session information associating the source of the data packets with the requesting device. Additionally, the network receives a first subset of the data packets from the source for delivery to a destination identified by the data packets. After receiving the packets, the network identifies a destination device based on the destination identified by the packets. The network processes the session information to determine whether the destination device is associated with the source of the packets. If the destination device is associated with the source, the network transfers the packets for delivery to the destination device.

17 Claims, 6 Drawing Sheets

PACKET FILTERING BY SESSION SETUP ASSOCIATION IN A WIRELESS COMMUNICATION SYSTEM

TECHNICAL BACKGROUND

Wireless devices, such as cellular phones, communicate with other devices and systems using wireless communication networks. In order to use a wireless communication network, a wireless device must first register with the wireless communication network. When a wireless device registers with a wireless network, the wireless network assigns a network address, such as an IP address, to the wireless device. The network address of the wireless device is used for routing communications to the wireless device.

In some situations, a wireless device may lose wireless connectivity with a wireless network after requesting data communications but before the wireless device receives all of the requested data communications. After losing connectivity with the wireless device, the wireless network may reassign the network address of the wireless device to a second wireless device that registers with the wireless network. This reassignment of the network address to the second wireless device may cause the undelivered data communications requested by the first wireless device to be delivered to the second wireless device. Delivering unwanted packets to the second wireless device uses unnecessary bandwidth on the communication network and requires more processing in the new wireless device to determine that the packets are unneeded, thus using more battery power of the second wireless device.

OVERVIEW

Embodiments disclosed herein provide systems and methods for packet filtering in a wireless communication network. In a particular embodiment, a wireless network receives from a requesting device a request for a plurality of data packets to be transferred by a source for delivery to the requesting device. The network then generates session information associating the source of the data packets with the requesting device. Additionally, the network receives a first subset of the data packets from the source for delivery to a destination identified by the data packets. After receiving the packets, the network identifies a destination device based on the destination identified by the packets. The network processes the session information to determine whether the destination device is associated with the source of the packets. If the destination device is associated with the source, the network transfers the packets for delivery to the destination device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
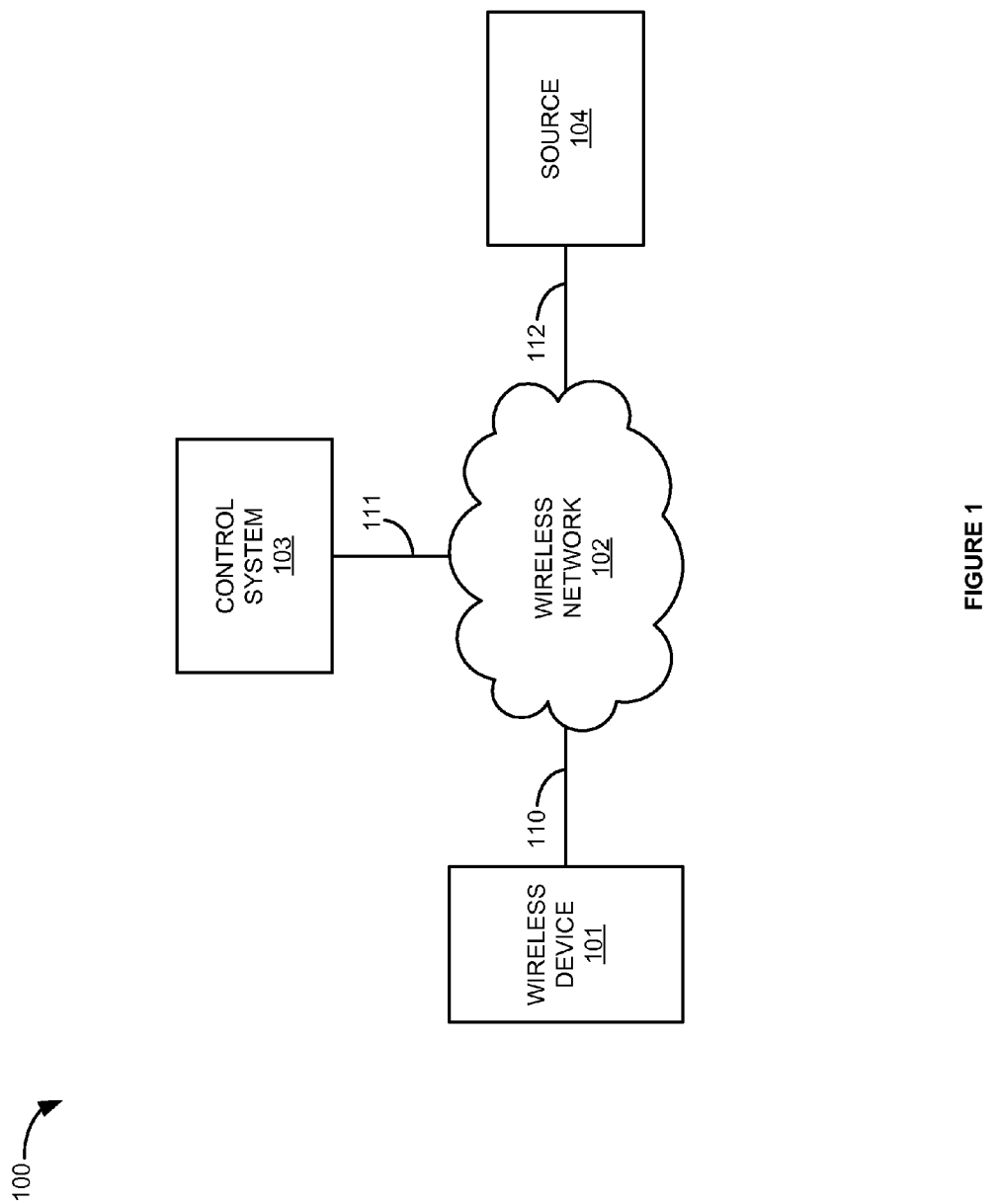
FIG. 1 illustrates a wireless communication system.

FIG. 1 illustrates wireless communication system 100. Wireless communication system 100 includes wireless communication device 101, wireless communication network 102, control system 103, and source 104. Wireless device 101 and wireless network 102 communicate over wireless link 110. Control system 103 and wireless network 102 communicate over link 111. Source 104 and wireless network 102 communicate over link 112.

Figure 2:
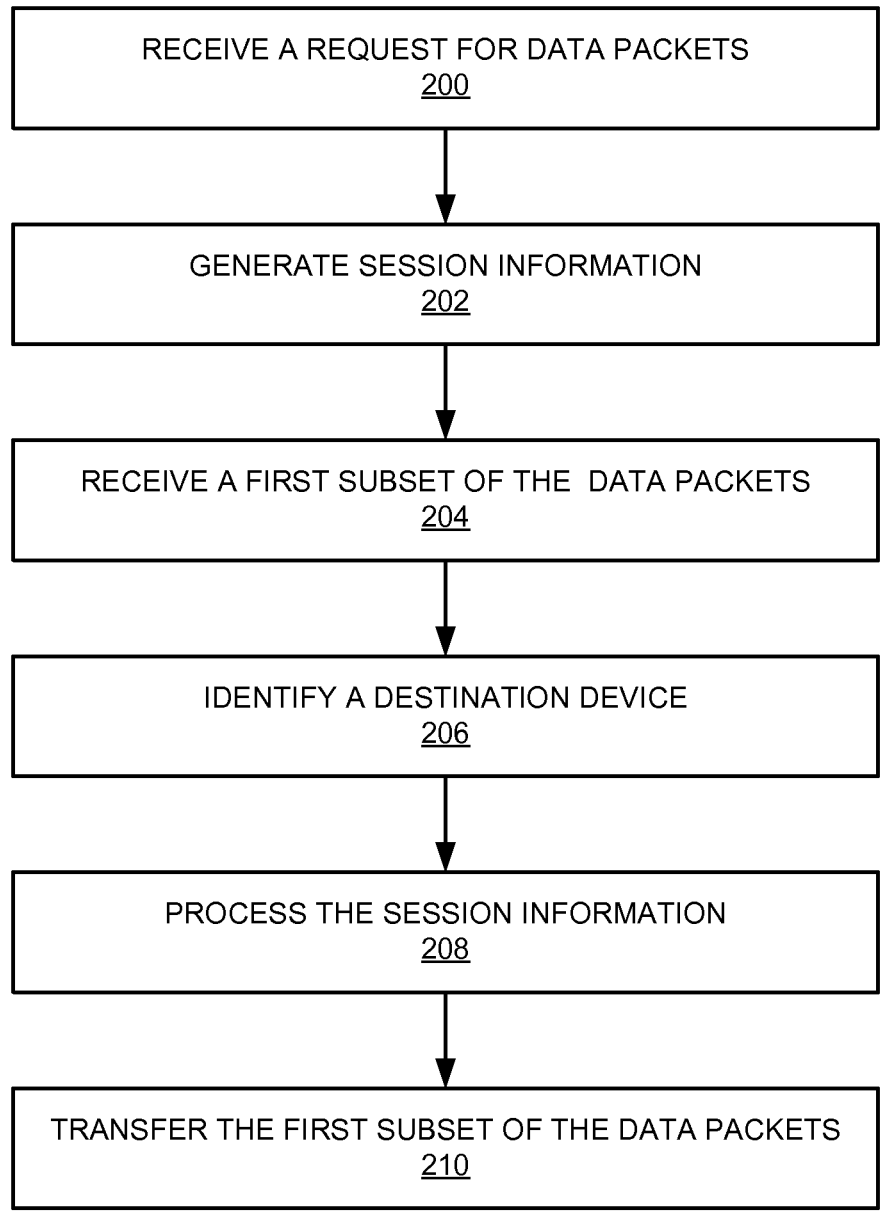
FIG. 2 illustrates the operation of a wireless communication system.

FIG. 2 illustrates the operation of wireless communication system 100. First, the method includes receiving a request for data packets (step 200). Control system 103 receives the request from wireless device 101. The data packets are to be transferred by source 104 for delivery to wireless device 101. Control system 103 may receive the request because source data request communications from wireless devices on wireless network 102 are routed through control system 103 before being routed to a source. The source could be any system that provides data packet communications to wireless device 101. Source 104 may be a web server, streaming video system, streaming audio system, VoIP system, email server, or any other system that is capable of providing data packet communications to wireless device 101.

The next step generates session information (step 202). The session information associates source 104 of the data packets with wireless device 101. The session information indicates to control system 103 that the data packets sent from source 104, in response to the request from wireless device 101, is destined for wireless device 101 regardless of a network identifier currently associated with wireless device 101. Control system 103 may identify wireless device 101 for association with the packets based on a mobile identifier for wireless device 101, such as an electronic serial number (ESN) for wireless device 101, media access control (MAC) address, network access identifier (NAI), phone number, or by some other identifier that is unique to wireless device 101 and cannot be assigned to any other device by wireless network 102.

In response to the request from wireless device 101, source 104 begins transference of the requested data packets. The following step receives a first subset of the data packets (step 204). The first subset of the data packets are received by control system 103 after being transferred from source 104 for delivery to a destination identified by the received data packets. Control system 103 may receive the packets because packet communications on wireless network 102 are routed through control system 103 before being routed to a destination. The destination identified for the packets may be a network address, such as an IP address, assigned to wireless device 101 by wireless network 102. The network address may not be permanently associated with wireless device 101, and may be assigned to other wireless devices by wireless network 102 if wireless device 101 stops communicating with wireless network 102.

The next step identifies a destination device (step 206). The destination device is identified based on the destination identified by the received data packets. Control system 103 may identify a destination device by determining which wireless device is associated with the network address that is identified as the destination by the data packets. For example, control system 103 may keep a table, or some other data structure, that tracks which mobile identifier is associated with a given IP address. Additionally, the table may contain a session lifetime and port numbers associated with each mobile identifier.

Next, the method processes the session information (step 208). The session information is processed by control system 103 to determine whether the destination device is associated with source 104 of the received first subset of the data packets. The destination device is associated with source 104 if the session information indicates that the destination device is the same wireless device that requested the data packets from source 104. There may be alternative ways that wireless device 101 could be associated with the first subset of the data packets because in some situations, such as push email, there is no request from the device. In those situations, wireless device 101 may indicate allowed sources to control system 103 after wireless device 101 registers with wireless network 102. Thus, control system 103 will also associate any packets from those allowed sources with wireless device 101.

As an alternative to steps 206 and 208, control system 103 may determine whether wireless network 102 has reassigned or unassigned the network address of wireless device 101 since receiving the packet request from wireless device 101. If the address has not been reassigned, the control system 103 may assume that the packets are still associated with the network address. Conversely, if the network address has been reassigned, control system 103 may assume that the packets are no longer associated with the network address. Additionally, in some embodiments, if the network address is no longer assigned to wireless device 101 but has not been assigned to another wireless device, then the packets are no longer associated with the network address.

In some embodiments, control system 103 uses session lifetime and/or communication ports associated with the destination device to determine if the packets are associated with the destination device. If either the session lifetime or the communication ports do not match, or otherwise indicate that the packet session could not be associated with the destination device, then control system 103 does not allow the packets to be transferred to the destination device. For example, the session lifetime of the destination device may be shorter than the time that has elapsed since the packets were requested and, thus, the packets are not associated with the destination device.

The next step transfers the first subset of the packets (step 210). Control system 103 only transfers the first subset of the packets to the destination device if the destination device is associated with source 104. In this example, wireless device 101 is the destination device and wireless device 101 is associated with the source, thus, control system 103 transfers the first subset of the data packets along to wireless device 101.

If the destination device indicated by the first subset of the data packets is not associated with wireless device 101, then control system 103 will not transfer the first subset of the data packets to the destination device because the destination device did not request the packets from source 104. Such a situation may occur if wireless device 101 stops communicating with wireless network 104, thereby disassociating wireless device 101 with the network address of wireless device 101 from when wireless device 101 made the data packet request. Communications may be stopped by wireless device 101 losing wireless connectivity with wireless network 102, wireless device 101 powering down, an error in wireless device 101 or wireless network 102, or any other reason that wireless device 101 could lose communications with wireless network 102. Control system 103 may discard any untransferred data packets. Control system 103 may also have the capability to send a packet transfer termination request to source 104, which will stop source 104 from transferring any more subsets of the data packets. Alternatively, control system 103 may do further processing to determine whether wireless device 101 has been reassigned another network address on wireless network 102, then control system may transfer the first subset of data packets to the new network address of wireless device 101.

Control system 103 may then receive a second subset of the data packets from source 104 for delivery to a destination identified by the second subset of the data packets. As with the first subset, control system 103 will identify a destination device based on the destination identified by the second subset of the data packets. Control system 103 then processes the session information to determine whether the destination device is associated with source 104 of the second subset of the data packets. If the destination device is associated with source 104, then control system 103 transfers the second subset of the data packets to the destination device.

Furthermore, steps 204-210 may occur continually with third, fourth, fifth, etc. subsets until all data packets are transferred from source 104 in response to the request by wireless device 101. In an example, control system 103 may recognize an end of packet transmission indicator within the data packets or control system 103 may receive a termination request from wireless device 101 to source 104 that terminates the associated session. In response to receiving an indication ending packet transmission from source 104, control system 103 disassociates the packets sent from source 104 with wireless device 101. Thus, any packets transferred from source 104 to wireless device 101 after the indication ending packet transmission will not be transferred to wireless device 101 because wireless device 101 is no longer associated with source 104.

Therefore, FIG. 2 shows that control system 103 will process data packets sent from source 104 to an identified destination to determine whether the identified destination requested or is otherwise associated with the packets. If the packets are not associated with the identified destination, control system 103 does not transfer the packets to the destination.

The subset of the data packets may be a single packet, the entire data packet set, and any size in between. Hence, the packets may be processed by control system 103 one at a time before being transferred to wireless device 101 or may be received and processed in larger subsets before transferring to wireless device 101.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless communication network 102 is a communication networks that comprises telephony switches, wireless access nodes, Internet routers, network gateways, computer systems, communication links, or some other type of communication equipment—including combinations thereof.

Communication control system 103 comprises a computer system and communication interface. Communication control system 103 may also include other components such as a router, server, data storage system, and power supply. Communication control system 103 may reside in a single device or may be distributed across multiple devices. Communication control system 103 is shown externally to wireless network 102, but system 103 could be integrated within the components of wireless network 102. Communication control system 103 could be a home agent, mobile switching center, network gateway system, Internet access node, application server, service node, or some other communication system—including combinations thereof.

Source 104 comprises a computer system and communication interface. Source 104 may also include other components such a router, server, data storage system, and power supply. Source 104 may reside in a single device or may be distributed across multiple devices. Source 104 is shown externally to wireless network 102, but source 104 could be integrated within the components of wireless network 102. Source 104 could be a mobile switching center, network gateway system, Internet access node, application server, IMS core, service node, or some other communication system—including combinations thereof. Source 104 may provide a website, email, audio, video, VoIP, or some other application or service that mobile device 101 could access over wireless network 102.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 111-112 use metal, glass, air, space, or some other material as the transport media. Communication links 111-112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-112 could be a direct link or may include intermediate networks, systems, or devices.

Figure 3:
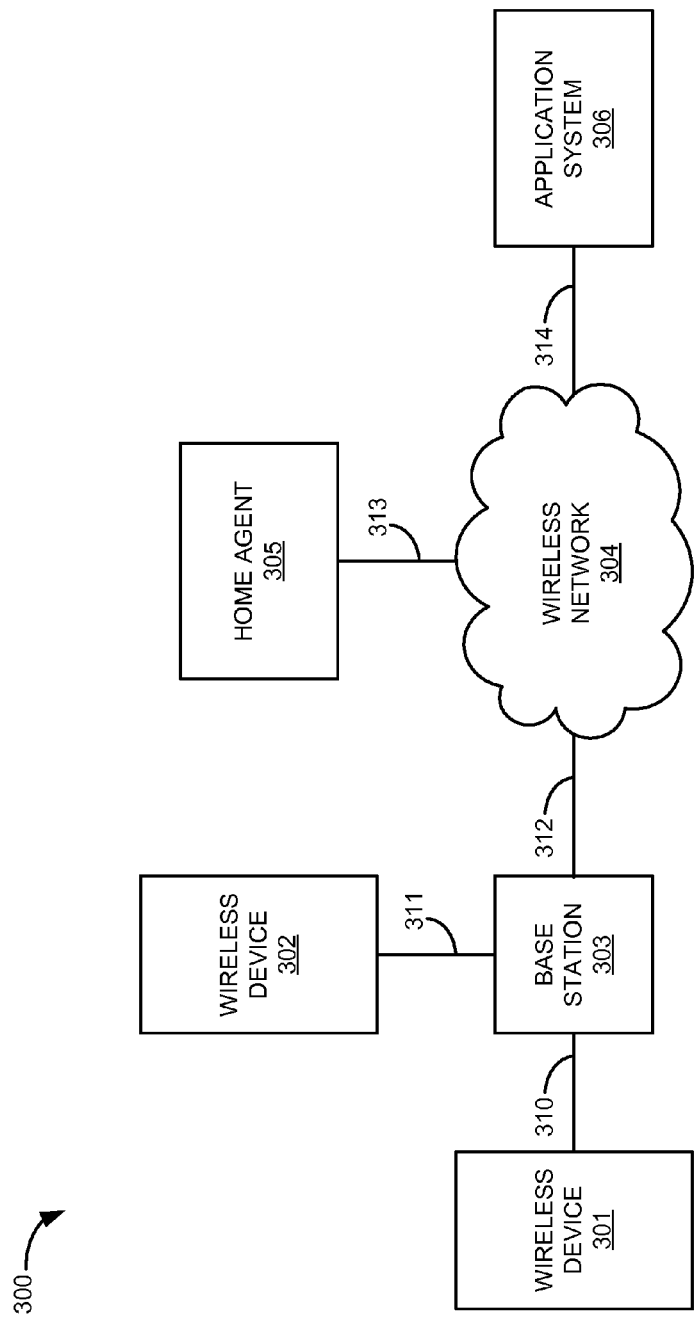
FIG. 3 illustrates a wireless communication system.

FIG. 3 illustrates wireless communication system 300. Wireless communication system 300 includes wireless communication device 301, wireless communication device 302, base station 303, wireless communication network 304, home agent 305, and application system 306. Wireless device 301 and base station 303 communicate over wireless link 310. Wireless device 302 and base station 303 communicate over wireless link 311. Base station 303 and wireless network 304 communicate over link 312. Home agent 305 and wireless network 304 communicate over link 313. Application system 306 and wireless network 304 communicate over link 314.

Figure 4:
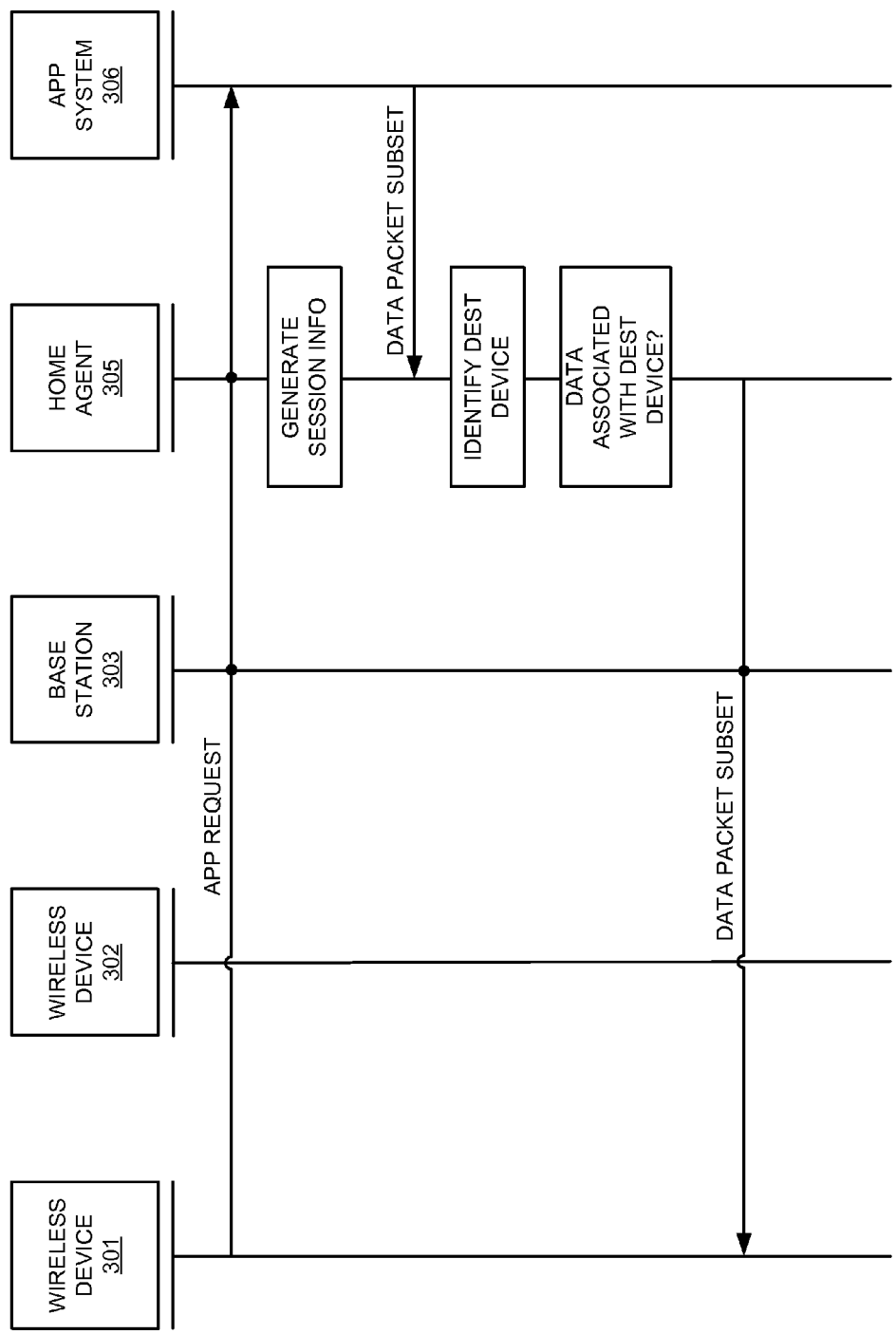
FIG. 4 illustrates the operation of a wireless communication system.

FIG. 4 is a sequence diagram illustrating the operation of wireless network 300. Wireless device 101 is communicating with wireless network 304 via base station 303. When initially registering with wireless network 304, wireless device 301 is assigned an IP address by wireless network 304 that will be used for directing communications to wireless device 301. Wireless device 301 may receive a user input indicating an application data request, an application running on wireless device 301 may request application data itself, or any other reason that wireless device 301 may request data. The application data could be a website, email, streaming media, media download, file download, or any other type of data that wireless device 301 could receive from application system 306.

The sequence of FIG. 4 begins with wireless device 301 transferring a request to application system 306 for application data packets. The request passes through home agent 305 in wireless network 304 before being received in application system 306. In response to intercepting the data packet request, home agent 305 generates session information associating the requested data packet session from application system 306 with wireless device 301. Home agent 305 may associate wireless device 301 with the session by associating the IP address currently assigned to wireless device 301 and the NAI of wireless device 301 with the application data packets from application system 306.

In response to receiving the application request, application system 306 transfers a first subset of the requested application data packets to wireless device 301 by directing the subset to the IP address assigned to wireless device 301 when wireless device 301 made the data request. Home agent 305 intercepts the data packets as the data packets are routed through wireless network 304 on their way to the IP address that was assigned to wireless device 301 when wireless device 301 made the application request.

Home agent 305 then identifies a destination device based on the IP address identified by the data packets. Home agent identifies the destination device by determining which wireless device NAI is currently assigned the IP address identified by the data packets. In this example, since wireless device 301 is still assigned the IP address, home agent 305 determines that the IP address is assigned to the wireless device having the NAI of wireless device 301.

After identifying that wireless device 301 is associated with the IP address, home agent 305 processes the session information to determine whether wireless device 301 is associated with the data packets sent from application system 306. The session information indicates that wireless device 301 requested the data packets from application system 306, thus, wireless device 301 is associated with the data packets from application system 306. Since wireless device 301 is associated with the data packets, home agent 305 allows the transference of the data packets to the indicated IP address. Therefore, only data packets that are meant for wireless device 301 will be transferred to wireless device 301 from wireless network 304.

Figure 5:
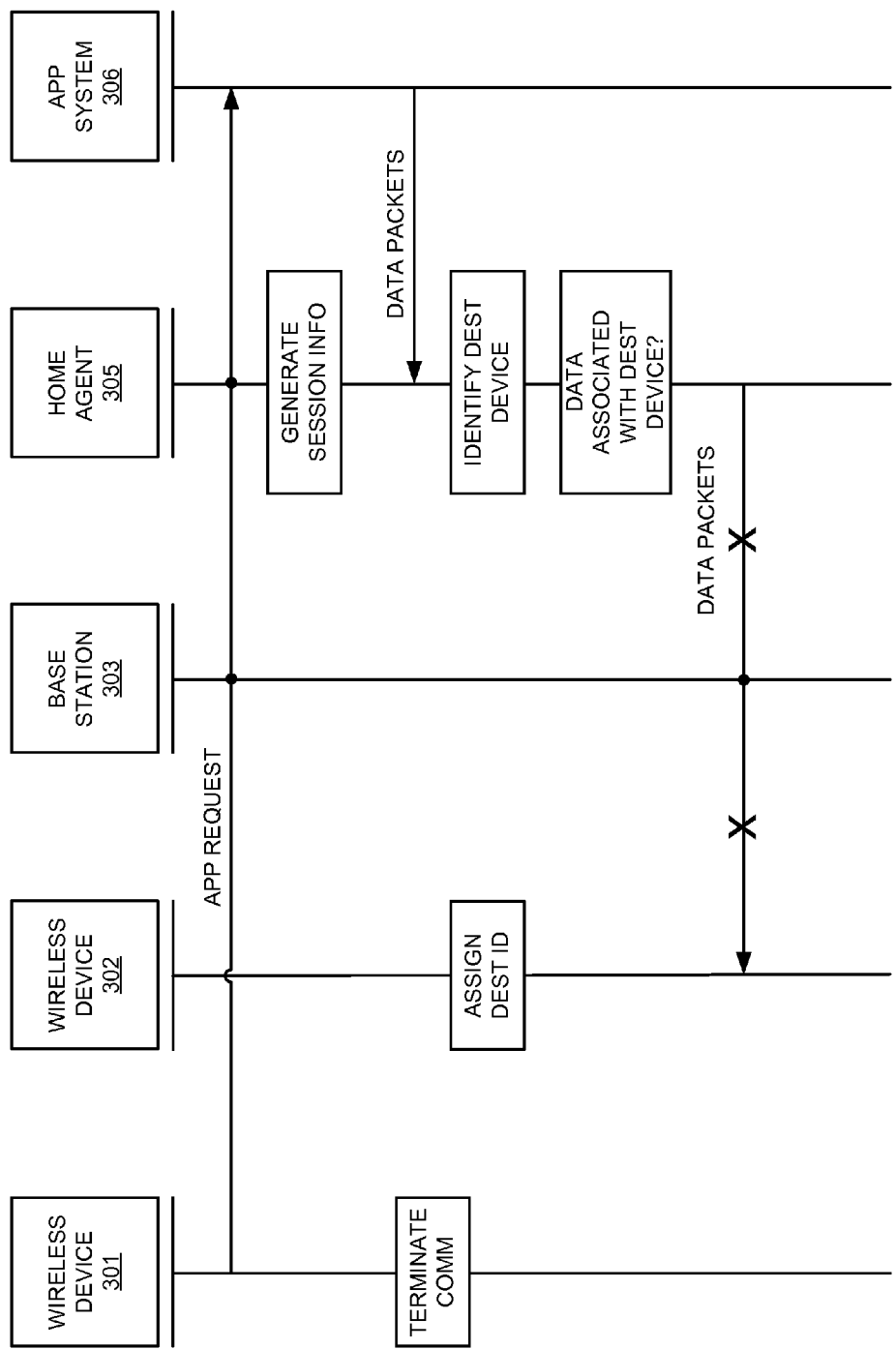
FIG. 5 illustrates the operation of a wireless communication system.

FIG. 5 is a sequence diagram illustrating the operation of wireless network 300. Wireless device 101 is communicating with wireless network 304 via base station 303. When initially registering with wireless network 304, wireless device 301 is assigned an IP address by wireless network 304 that will be used for directing communications to wireless device 301. Wireless device 301 may receive a user input indicating an application data request, an application running on wireless device 301 may request application data itself, or any other reason that wireless device 301 may request data. The application data could be a website, email, streaming media, media download, file download, or any other type of data that wireless device 301 could receive from application system 306.

The sequence of FIG. 5 begins with wireless device 301 transferring a request to application system 306 for application data packets. The request passes through home agent 305 in wireless network 304 before being received in application system 306. In response to intercepting the data packet request, home agent 305 generates session information associating the requested data packet session from application system 306 with wireless device 301. Home agent 305 may associate wireless device 301 with the session by associating the IP address currently assigned to wireless device 301 and the NAI of wireless device 301 with the application data packets from application system 306.

In response to receiving the application request, application system 306 transfers a first subset of the requested application data packets to wireless device 301 by directing the subset to the IP address assigned to wireless device 301 when wireless device 301 made the data request. Home agent 305 intercepts the data packets as the data packets are routed through wireless network 304 on their way to the IP address that was assigned to wireless device 301 when wireless device 301 made the application request.

At a point in time after wireless home agent 305 generates the session information, wireless device 301 loses connectivity with wireless network 304. After wireless device 301 loses connectivity, the wireless device 302 registers with wireless network 304. Wireless device 302 is assigned the same IP address that was assigned to wireless device 301 when wireless device 301 requested the data packets. Wireless device 302 is shown connected to base station 303, but could be connected to any access node on wireless network 304.

Home agent 305 then identifies a destination device based on the IP address identified by the data packets. Home agent identifies the destination device by determining which wireless device NAI is currently assigned the IP address identified by the data packets. In this example, since wireless device 302 is now assigned the IP address originally with wireless device 301, home agent 305 determines that the IP address is assigned to the wireless device having the NAI of wireless device 302.

After identifying that wireless device 302 is associated with the IP address, home agent 305 processes the session information to determine whether wireless device 302 is associated with the data packets sent from application system 306. The session information indicates that wireless device 301 requested the data packets from application system 306, thus, it is wireless device 301, not wireless device 302, that is associated with the data packets from application system 306. Since wireless device 302 is not associated with the data packets, home agent 305 does not allow the transference of the data packets to the indicated IP address. Therefore, data packets that are meant for wireless device 301 are not transferred to wireless device 302 from wireless network 304.

In some embodiments, home agent 305 may transfer a message to application system 306 indicating that wireless device 301 is not longer available for packet reception. Upon receipt of the message, application system 306 may cease transmission of packets intended for wireless device 301. The message may be a reset message using the Internet control message protocol (ICMP).

Figure 6:
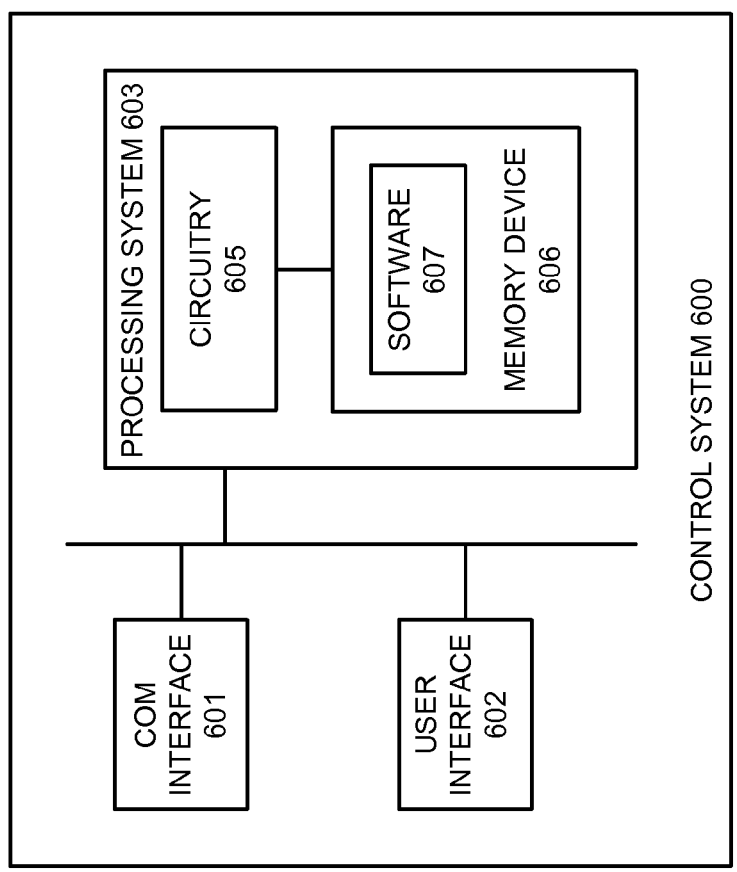
FIG. 6 illustrates a communication control system.

FIG. 6 illustrates communication control system 600. Communication control system 600 is an example of communication control system 103, although control system 103 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate communication control system 600 as described herein.

In particular, operating software 607 directs processing system 603 to instruct communication interface to receive from a requesting device a request for a plurality of data packets to be transferred by a source for delivery to the requesting device. Processing system 603 then generates session information associating the source of the data packets with the requesting device. Communication interface 601 receives a first subset of the data packets from the source for delivery to a destination identified by the first subset of the data packets. Processing system 603 identifies a destination device based on the destination identified by the first subset of the data packets. After the identification, processing system 603 processes the session information to determine whether the destination device is associated with the source of the first subset of the data packets. Communication interface 601 transfers the first subset of the data packets for delivery to the destination device if the destination device is associated with the source.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   receiving from a requesting device a request for a plurality of data packets to be transferred by a source for delivery to the requesting device;
   generating session information associating the source of the plurality of data packets with the requesting device;
   receiving a first subset of the plurality of data packets from the source for delivery to a destination identified by the first subset of the plurality of data packets;
   identifying a destination device based on the destination identified by the first subset of the plurality of data packets;
   processing the session information to determine whether the destination device is associated with the source of the first subset of the plurality of data packets;

transferring the first subset of the plurality of data packets for delivery to the destination device if the destination device is associated with the source;

receiving a second subset of the plurality of data packets from the source for delivery to a second destination identified by the second subset of the plurality of data packets;

identifying a second destination device based on the second destination identified by the second subset of the plurality of data packets;

processing the session information to determine whether the second destination device is associated with the source of the second subset of the plurality of data packets; and transferring the second subset of the plurality of data packets for delivery to the second destination device if the destination device is associated with the source.

2. The method of claim 1 further comprising discarding the first subset of the plurality of data packets if the destination device is not associated with the source.

3. The method of claim 2 wherein the destination device is associated with the source if the destination device is the same device as the requesting device.

4. The method of claim 3 wherein the destination device is not associated with the source if the destination device is not the same device as the requesting device.

5. The method of claim 4 wherein the destination device is the same device as the requesting device if the devices have the same network access identifier.

6. The method of claim 1 wherein the destination identified by the first subset of the plurality of data packets is an IP address.

7. The method of claim 6 wherein the destination device is associated with the source if the IP address has not been reassigned to another device at a time after receiving the request for the first subset of the plurality of data packets.

8. A communication system comprising:
a requesting device configured to transfer a request for a plurality of data packets from a source; and,
a control system in communication with the requesting device and configured to:
receive the request for the plurality of data packets to be transferred by the source for delivery to the requesting device;
generate session information associating the source of the plurality of data packets with the requesting device;
receive a first subset of the plurality of data packets from the source for delivery to a destination identified by the first subset of the plurality of data packets;
identify a destination device based on the destination identified by the first subset of the plurality of data packets;
process the session information to determine whether the destination device is associated with the source of the first subset of the plurality of data packets;
transfer the first subset of the plurality of data packets for delivery to the destination device if the destination device is associated with the source;
receive a second subset of the plurality of data packets from the source for delivery to a second destination identified by the second subset of plurality of data packets;
identify a second destination device based on the second destination identified by the second subset of the plurality of data packets;
process the session information to determine whether the second destination device is associated with the source of the second subset of the plurality of data packets; and
transfer the second subset of the plurality of data packets for delivery to the second destination device if the second destination device is associated with the source.

9. The communication system of claim 8 wherein the control system is further configured to discard the plurality of data packets if the destination device is not associated with the source.

10. The communication system of claim 9 wherein the destination device is associated with the source if the destination device is the same device as the requesting device.

11. The communication system of claim 10 wherein the destination device is not associated with the source if the destination device is not the same device as the requesting device.

12. The communication system of claim 10 wherein the destination device is the same device as the requesting device if the devices have the same network access identifier.

13. The communication system of claim 8 wherein the destination identified by the first subset of the plurality of data packets is an IP address.

14. The communication system of claim 13 wherein the destination device is associated with the source if the IP address has not been reassigned to another device at a time after receiving the request for the plurality of data packets.

15. A communication control system comprising:
an interface configured to receive from a requesting device a request for a plurality of data packets to be transferred by a source for delivery to the requesting device, receive a first subset of the plurality of data packets from the source for delivery to a destination identified by the first subset of the plurality of data packets, and transfer the first subset of the plurality of data packets for delivery to a destination device if the destination device is associated with the source;
a processing system configured to generate session information associating the source of the plurality of data packets with the requesting device, identify the destination device based on the destination identified by the first subset of the plurality of data packets, and process the session information to determine whether the destination device is associated with the source of the first subset of the plurality of data packets;
the interface further configured to receive a second subset of the plurality of data packets from the source for delivery to a second destination identified by the second subset of the plurality of data packets, and transfer the second subset of the plurality of data packets for delivery to a second destination device if the second destination device is associated with the source; and
the processing system configured to identify the second destination device based on the second destination identified by the second subset of the plurality of data packets, and process the session information to determine whether the second destination device is associated with the source of the second subset of the plurality of data packets.

16. The communication control system of claim 15 wherein the processing system is further configured to discard the plurality of data packets if the destination device is not associated with the source.

17. The communication control system of claim 16 wherein the destination device is associated with the source if the destination device is the same device as the requesting device.

* * * * *

UNITED STATES PATENT AND TRADEMARK OFFICE
CERTIFICATE OF CORRECTION

| | | |
|---|---|---|
| PATENT NO. | : 8,571,022 B1 | Page 1 of 1 |
| APPLICATION NO. | : 12/762575 | |
| DATED | : October 29, 2013 | |
| INVENTOR(S) | : Kosol Jintaseranee and Travis Edward Dawson | |

It is certified that error appears in the above-identified patent and that said Letters Patent is hereby corrected as shown below:

On the Title Page 1, item (73) Assignee is incorrect. The Assignee reading "Sprint Spectrum L.P.", should read --Sprint Communications Company L.P.--

Signed and Sealed this
Seventeenth Day of March, 2015

Michelle K. Lee
*Director of the United States Patent and Trademark Office*